(12) United States Patent
Porte

(10) Patent No.: US 8,677,764 B2
(45) Date of Patent: Mar. 25, 2014

(54) AIRCRAFT PROPULSION ASSEMBLY COMPRISING HOT AIR BLEED SYSTEMS

(75) Inventor: Alain Porte, Colomiers (FR)

(73) Assignee: Airbus Operations S.A.S., Toulouse (FR)

( * ) Notice: Subject to any disclaimer, the term of this patent is extended or adjusted under 35 U.S.C. 154(b) by 631 days.

(21) Appl. No.: 12/810,870

(22) PCT Filed: Dec. 22, 2008

(86) PCT No.: PCT/FR2008/052398
§ 371 (c)(1),
(2), (4) Date: Jun. 28, 2010

(87) PCT Pub. No.: WO2009/083691
PCT Pub. Date: Jul. 9, 2009

(65) Prior Publication Data
US 2010/0281880 A1    Nov. 11, 2010

(30) Foreign Application Priority Data
Dec. 28, 2007   (FR) ..................................... 07 60439

(51) Int. Cl.
*F02C 6/04*   (2006.01)
(52) U.S. Cl.
USPC ........................................ 60/785; 60/39.093
(58) Field of Classification Search
USPC ..... 60/39.093, 785; 244/134 B, 134 C, 134 R
See application file for complete search history.

(56) References Cited

U.S. PATENT DOCUMENTS

| 3,981,466 | A | * | 9/1976 | Shah ......................... 244/134 R |
| 4,083,181 | A | * | 4/1978 | Adamson ..................... 60/39.52 |
| 4,550,564 | A | * | 11/1985 | Callahan et al. ........... 60/39.093 |
| 4,783,026 | A | * | 11/1988 | Rumford et al. .......... 244/134 R |
| 6,698,691 | B2 | | 3/2004 | Porte |
| 2007/0221788 | A1 | * | 9/2007 | Meister ......................... 244/208 |
| 2009/0294593 | A1 | | 12/2009 | Jacquet-Francillon et al. |

FOREIGN PATENT DOCUMENTS

| DE | 33 33 437 | 4/1985 |
| EP | 1 232 944 | 8/2002 |
| FR | 2 875 542 | 3/2006 |

OTHER PUBLICATIONS

International Search Report dated May 28, 2009, from corresponding PCT application.

* cited by examiner

*Primary Examiner* — Phutthiwat Wongwian
(74) *Attorney, Agent, or Firm* — Young & Thompson

(57) ABSTRACT

An aircraft propulsion unit includes a nacelle in which a power plant is arranged. The nacelle includes an inside wall that delimits a pipe with an air intake at the front. The propulsion unit includes a frost treatment system having at least one first pipe equipped with elements for regulating the passing air, for directing the hot air from the power plant to the air intake, and, an exhaust system having at least one second pipe equipped with elements for regulating the passing air, for directing air from the power plant to a delivery zone. The at least one second pipe is connected to the at least one first pipe, and the elements for regulating the air that passes into the at least one first pipe are separate from the elements for regulating the air that passes into the at least one second pipe.

18 Claims, 2 Drawing Sheets

AIRCRAFT PROPULSION ASSEMBLY COMPRISING HOT AIR BLEED SYSTEMS

BACKGROUND OF THE INVENTION

1. Field of the Invention

This invention relates to a propulsion unit that comprises systems for tapping hot air whose purpose is to reduce the sound emission of said power plant.

2. Description of the Related Art

Figure 1:
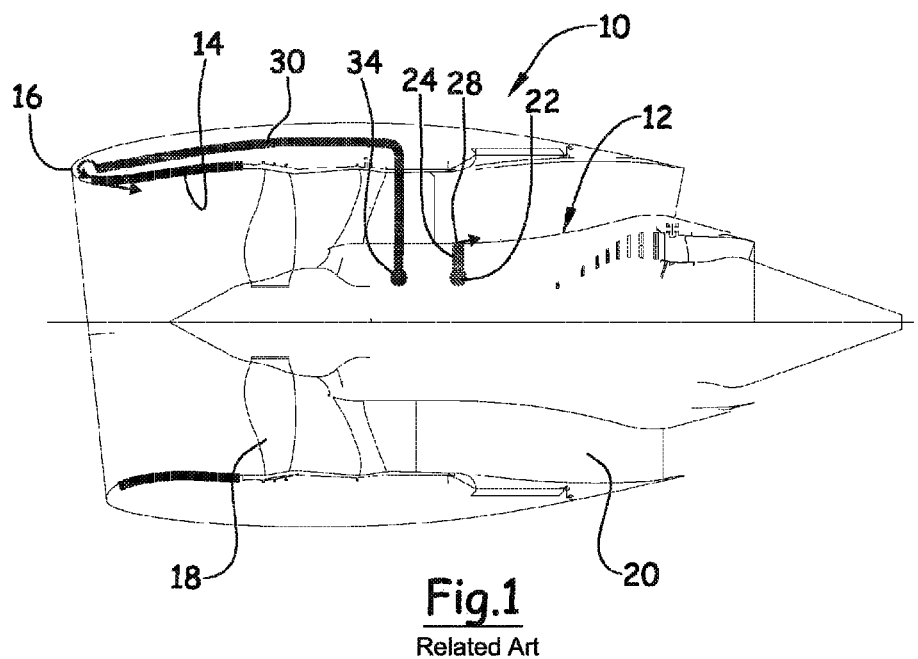
Figure 2:
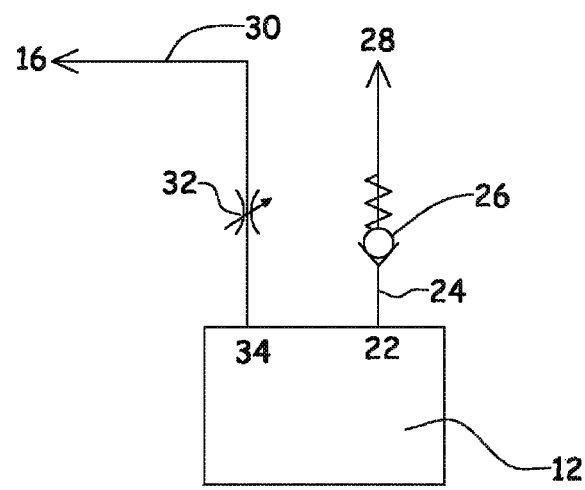

FIGS. 1 and 2 show a propulsion unit of an aircraft that comprises a nacelle 10 in which a power plant 12, connected by means of a mast to the rest of the aircraft, is arranged essentially concentrically.

The nacelle 10 comprises an inside wall that delimits a pipe 14 with an air intake 16 at the front, whereby a first portion of the incoming air stream, called a primary stream, passes through the power plant 12 to assist the combustion, and whereby the second portion of the air stream, called the secondary stream, is entrained by a fan 18 and flows into an annular pipe 20 that is delimited by the inside wall of the nacelle and the outside wall of the power plant.

The power plant 12 comprises an exhaust system, for example for preventing "pumping" phenomena of the power plant at takeoff, whereby said system makes it possible to tap air at a first tapping point 22 in the combustion chamber and to eject it outside of the power plant 12. For this purpose, the power plant comprises a pipe 24 that is equipped with a valve 26 for directing the air under certain conditions from the first tapping point 22 to the delivery zone, outside of the power plant via an orifice 28 that empties into the annular pipe 20, in particular via a large number of orifices that are made in the nozzle. This system is called a "pepper pot."

This ejection into the annular pipe 20 has the major drawback of emitting noise.

In parallel, the propulsion unit can comprise a pneumatic-type frost treatment system whose purpose is to tap hot air at the power plant and to deliver it to the air intake 16. Such a system is described in particular in the document EP-1,232,944.

This frost treatment system comprises at least one pipe 30 that is optionally equipped with means for adjusting the flow rate 32 to direct the hot air from a second tapping point 34 into the power plant toward the air intake. After having circulated at the air intake to achieve defrosting, the hot air is discharged into the air passage that enters into the pipe 14 of the nacelle. The delivery of the hot air that is used for defrosting the air intake does not generate noise pollution.

SUMMARY OF THE INVENTION

The purpose of this invention is to propose an aircraft propulsion unit that comprises systems for tapping hot air in the power plant whose purpose is to reduce the sound emission of said power plant, in particular the one that is associated with the exhaust system.

For this purpose, the invention has as its object an aircraft propulsion unit that comprises a nacelle in which a power plant is arranged, whereby said nacelle comprises an inside wall that delimits a pipe with an air intake at the front, whereby the propulsion unit comprises, on the one hand, a frost treatment system that comprises at least one first pipe that is equipped with means for regulating the passing air, for directing the hot air from the power plant to the air intake, and, on the other hand, an exhaust system that comprises at least one second pipe that is equipped with means for regulating the passing air, for directing air from the power plant to a delivery zone, whereby said at least one second pipe is connected to said at least one first pipe, characterized in that the means for regulating the air that passes into said at least one first pipe are separate from the means for regulating the air that passes into said at least one second pipe.

BRIEF DESCRIPTION OF THE DRAWING FIGURES

Figure 3:
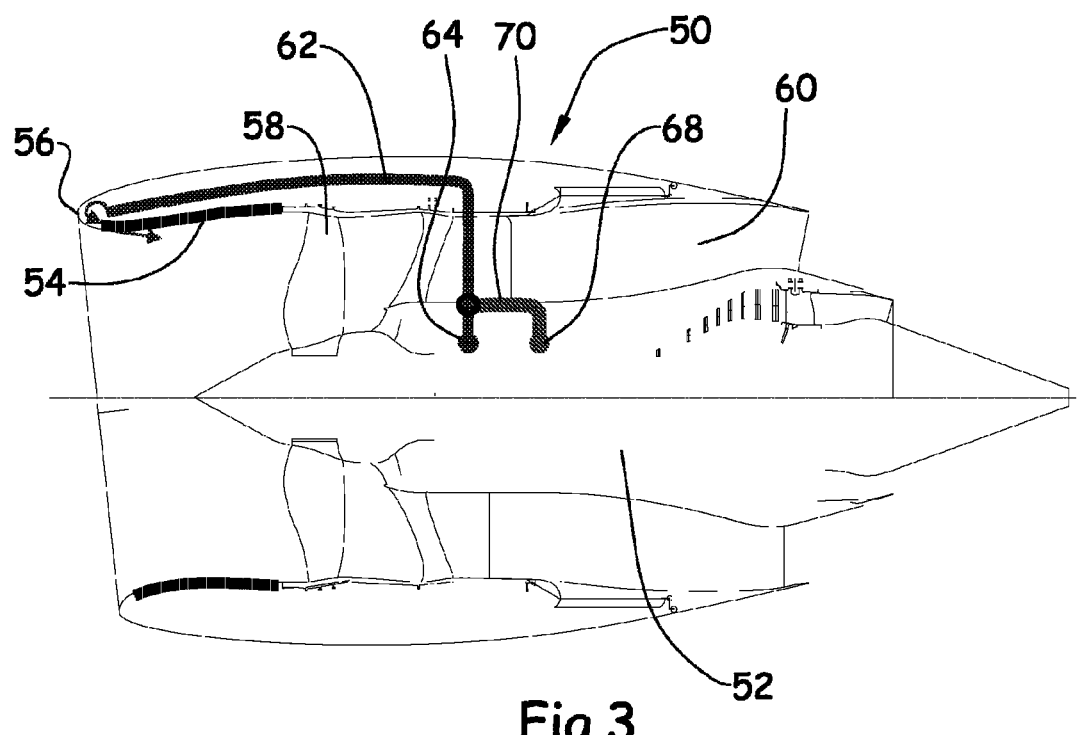
Figure 4:
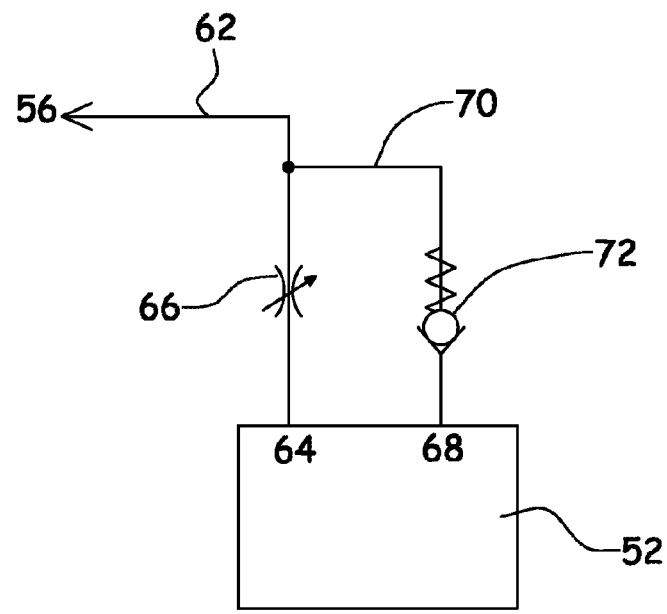

Other characteristics and advantages will emerge from the following description of the invention, a description that is provided only by way of example, relative to the accompanying drawings in which:

FIG. 1 is a cutaway that schematically illustrates a propulsion unit according to the prior art, FIG. 2 is a diagram that illustrates the tapping systems according to the prior art, FIG. 3 is a cutaway that schematically illustrates a propulsion unit according to the invention, and FIG. 4 is a diagram that illustrates the tapping systems according to the invention.

DETAILED DESCRIPTION OF THE INVENTION

FIG. 3 shows a propulsion unit of an aircraft that comprises a nacelle 50 in which a power plant 52, connected by means of a mast to the rest of the aircraft, is arranged essentially concentrically.

The nacelle 50 comprises an inside wall that delimits a pipe 54 with an air intake 56 at the front that is also called a lip, whereby a first portion of the incoming air stream, called the primary stream, passes through the power plant 52 to assist the combustion, and whereby the second portion of the air stream, called the secondary stream, is conveyed by a fan 58 and flows into an annular pipe 60 that is delimited by the inside wall of the nacelle and the outside wall of the power plant.

The propulsion unit comprises a pneumatic-type frost treatment system whose purpose is to tap the hot air at the power plant and to deliver it to the air intake 56.

This frost treatment system comprises at least one first pipe 62 for directing the hot air from at least one first tapping point 64 into the power plant 52 toward the air intake 56. This system advantageously comprises first means 66 for regulating the passing air, in particular for adjusting the flow of hot air that is transmitted to the air intake. After having circulated at the air intake 56 to achieve defrosting, the hot air is discharged to the outside. According to the embodiment that is illustrated in FIG. 3, the air that is used for the defrosting is discharged into the air passage that enters into the pipe 54 of the nacelle. However, the invention is not limited to this solution, whereby the discharge of the air can be performed at the periphery of the nacelle.

The delivery of the air that is used for defrosting the air intake does not generate noise pollution.

The defrosting system as well as the air exhaust used for defrosting are not presented in more detail because they are known to one skilled in the art. Furthermore, they can take on different configurations, in particular the one that is described in the document EP-1,232,944.

In addition, the propulsion unit comprises an exhaust system, in particular for preventing "pumping" phenomena of the power plant upon takeoff, for the purpose of tapping air at a second tapping point 68 in the combustion chamber and in ejecting it toward a delivery zone, outside of the power plant 52. For this purpose, the power plant comprises at least one second pipe 70 that is equipped with second means 72 for regulating the passing air, such as a valve, for tapping the air from the second tapping point 68 to the delivery zone.

According to the invention, the second pipe 70 is connected to the first pipe 62 downstream from the second regulating means 72 so as to deliver the air that is tapped by the exhaust system into the first pipe 62 so that said air is discharged in the same manner as the air that is used for defrosting.

The means 72 for regulating air toward the second pipe 70 are different from the regulating means 66 so as to ensure the two functions, namely the defrosting and the exhaust in an optimal manner.

This solution has the advantage of eliminating the noise pollution that is produced by the exhaust system.

Furthermore, this arrangement contributes to enhancing the defrosting to the extent that the flow of hot air is more significant.

According to the variants, the first tapping point 64 and the second tapping point 68 can be arranged in the same zone of the power plant or in different zones.

The invention claimed is:

1. An aircraft propulsion unit that comprises:
   a nacelle in which a power plant is arranged, said nacelle comprising an inside wall that delimits a pipe with an air intake at a front of the nacelle;
   a propulsion unit comprising a frost treatment system that comprises at least one first pipe that is equipped with first means for regulating passing air, for directing hot air from the power plant to the air intake, and an exhaust system that comprises at least one second pipe that is equipped with second means for regulating the passing air, for directing air from a combustion chamber of the power plant to a delivery zone to be discharged into the air intake, and said at least one second pipe is connected to said at least one first pipe,
   wherein the first means for regulating air that passes into said at least one first pipe are separate from and parallel to the second means for regulating the air that passes into said at least one second pipe, and the first means for regulating air is a variable restriction.

2. The aircraft propulsion unit according to claim 1, wherein said at least one second pipe is connected to said at least one first pipe downstream from said first and second means for regulating the air that passes into said at least one first pipe and into said at least one second pipe.

3. The aircraft propulsion system according to claim 1, wherein the first pipe is connected to a first tapping point on the power plant through the first means for regulating the passing air, and the second pipe is connected to a second tapping point on the power plant through the second means for regulating the passing air.

4. The aircraft propulsion system according to claim 3, wherein the first tapping point and the second tapping point are arranged in a same zone of the power plant.

5. The aircraft propulsion system according to claim 3, wherein the first tapping point and the second tapping point are arranged in different zones of the power plant.

6. The aircraft propulsion system according to claim 1, wherein the second means for regulating the passing air is a valve.

7. The aircraft propulsion system according to claim 1, wherein the first means for regulating the passing air is different from the second means for regulating the passing air so as to optimize defrosting and exhaust.

8. An aircraft propulsion unit that comprises:
   a nacelle in which a power plant is arranged, said nacelle comprising an inside wall that delimits a pipe with an air intake at a front of the nacelle;
   a propulsion unit comprising a frost treatment system that comprises at least one first pipe that is equipped with a first air regulator, configured for directing hot air from the power plant to the air intake, and an exhaust system that comprises at least one second pipe that is equipped with second air regulator, configured for directing air from a combustion chamber of the power plant to a delivery zone to be discharged into the air intake, and said at least one second pipe is connected to said at least one first pipe,
   wherein the first air regulator is separate from and parallel to the second air regulator, and the first air regulator is a variable restriction.

9. The aircraft propulsion unit according to claim 8, wherein said at least one second pipe is connected to said at least one first pipe downstream from said first and second air regulators which regulates the air that passes into said at least one first pipe and into said at least one second pipe, and the first and second air regulators are arranged in parallel.

10. The aircraft propulsion system according to claim 8, wherein the first pipe is connected to a first tapping point on the power plant through the first air regulator, and the second pipe is connected to a second tapping point on the power plant through the second air regulator.

11. The aircraft propulsion system according to claim 10, wherein the first tapping point and the second tapping point are arranged in a same zone of the power plant.

12. The aircraft propulsion system according to claim 10, wherein the first tapping point and the second tapping point are arranged in different zones of the power plant.

13. The aircraft propulsion system according to claim 8, wherein the second air regulator is a valve.

14. The aircraft propulsion system according to claim 8, wherein the first means for regulating the passing air is different from the second means for regulating the passing air so as to optimize defrosting and exhaust.

15. An aircraft propulsion unit that comprises:
   a nacelle in which a power plant is arranged, said nacelle comprising an inside wall that delimits a pipe with an air intake at a front of the nacelle;
   a propulsion unit comprising a frost treatment system that comprises at least one first pipe that is equipped with a first air regulator comprising a variable constriction, configured for directing hot air from the power plant to the air intake, and an exhaust system that comprises at least one second pipe that is equipped with second air regulator comprising a valve, configured for directing air from a combustion chamber of the power plant to a delivery zone to be discharged into the air intake, and said at least one second pipe is connected to said at least one first pipe,
   wherein the first air regulator is separate from and parallel to the second air regulator.

16. The aircraft propulsion unit according to claim 15, wherein said at least one second pipe is connected to said at least one first pipe downstream from said first and second air regulators which regulates the air that passes into said at least one first pipe and into said at least one second pip, and the first and second air regulators are arranged in parallel.

17. The aircraft propulsion system according to claim 15, wherein the first pipe is connected to a first tapping point on the power plant through the first air regulator, and the second pipe is connected to a second tapping point on the power plant through the second air regulator.

18. The aircraft propulsion system according to claim 17, wherein the first tapping point and the second tapping point are arranged in a same zone of the power plant.

\* \* \* \* \*

UNITED STATES PATENT AND TRADEMARK OFFICE
CERTIFICATE OF CORRECTION

PATENT NO.        : 8,677,764 B2                                          Page 1 of 1
APPLICATION NO. : 12/810870
DATED             : March 25, 2014
INVENTOR(S)       : Alain Porte It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this
Twenty-ninth Day of September, 2015

Michelle K. Lee
*Director of the United States Patent and Trademark Office*